United States Patent

Warnan et al.

[11] Patent Number: 5,909,408
[45] Date of Patent: Jun. 1, 1999

[54] TOWED ACOUSTIC TRANSMITTER

[75] Inventors: Francois Warnan, Rambouillet; Jean-Pierre Baudoux, Antibes, both of France

[73] Assignee: Thomson-CSF, Paris, France

[21] Appl. No.: 08/973,467

[22] PCT Filed: Jun. 14, 1996

[86] PCT No.: PCT/FR96/00912

§ 371 Date: Mar. 17, 1998

§ 102(e) Date: Mar. 17, 1998

[87] PCT Pub. No.: WO97/00513

PCT Pub. Date: Jan. 3, 1997

[30] Foreign Application Priority Data

Jun. 16, 1995 [FR] France .................................. 95 07228

[51] Int. Cl.$^6$ .............................. G01J 1/38; B63B 21/66; B63B 21/04
[52] U.S. Cl. .......................... 367/106; 367/130; 114/244; 114/253
[58] Field of Search ..................... 367/106, 130; 114/244, 245, 253

[56] References Cited

U.S. PATENT DOCUMENTS

| 3,932,835 | 1/1976 | Abbott . |
| 4,658,750 | 4/1987 | Malcosky . |
| 4,756,268 | 7/1988 | Gjestrum et al. ........................ 114/242 |
| 4,861,297 | 8/1989 | Warnan et al. . |
| 4,954,110 | 9/1990 | Warnan . |
| 4,991,534 | 2/1991 | Warnan et al. . |
| 4,992,999 | 2/1991 | Yerby et al. ............................. 367/130 |
| 5,014,953 | 5/1991 | Warnan et al. . |
| 5,044,160 | 9/1991 | Warnan et al. . |
| 5,091,894 | 2/1992 | Warnan . |
| 5,381,909 | 1/1995 | Warnan . |
| 5,428,581 | 6/1995 | Doisy et al. . |

FOREIGN PATENT DOCUMENTS

| 0 193 215 | 9/1986 | European Pat. Off. . |
| 2 319 911 | 2/1977 | France . |
| 2 655 940 | 6/1991 | France . |

*Primary Examiner*—Ian J. Lobo
*Attorney, Agent, or Firm*—Oblon, Spivak, McClelland, Maier & Neustadt, P.C.

[57] ABSTRACT

The invention relates to towed acoustic transmitters forming an underwater vehicle which is itself intended for towing a linear acoustic receiving array (105). It consists in placing the vertical faired acoustic array (303) of such a transmitter at the very rear of the underwater vehicle, and in balancing the weight of this array by a faired ballast (313) situated at the very front thereof. These two parts are joined by a girder (310) of small cross-section, and the center of gravity of the whole is situated at the front of this girder and beneath it. The vehicle is towed by a cable (101) fastened to the vehicle by a hook (314) fixed to a swivel joint (315) above the center of gravity. It makes it possible to facilitate the operations of submersion and fishing-out of the whole while also achieving a greater depth of submersion.

20 Claims, 5 Drawing Sheets

TOWED ACOUSTIC TRANSMITTER

BACKGROUND OF THE INVENTION

1. Field of the Invention

The present invention relates to towed acoustic transmitters which make it possible to transmit acoustic signals in seawater which are intended in particular to be received, after reflection on a detected obstacle, by a linear acoustic receiving array which is itself towed astern of this transmitter.

2. Description of the Related Art

It is known to tow behind a boat an underwater vehicle which may contain various payloads such as a sonar. This vehicle sails astern of the towboat at a submersion determined for example by flaps which are manoeuvred appropriately so as to maintain this submersion at the desired value.

A particular case consists, as represented in FIG. 1, in towing behind a hauling boat 101, with the aid of a towing cable 102, a vehicle 103 essentially comprising an acoustic transmitter which makes it possible to sweep the underwater volume with sound. The return echoes obtained through this sound-sweeping are received by an acoustic linear array 105, which is itself towed by a cable 104 fastened astern of the underwater vehicle 103. This kind of device being intended to operate at relatively low frequencies, of the order of a kHz, the transmitter contained in the vehicle 103 is therefore relatively voluminous. To obtain the directivity characteristics which are generally desired, in particular in the vertical plane so as to combat the phenomena of reverberation, this acoustic transmitter is generally of elongate shape, with a height of around 4 to 5 times its thickness as well as its width.

In order to be able to maintain these directivity characteristics, it is of course necessary for the transmitting array, and hence the body of the vehicle to which it is generally rigidly attached, to move along a rectilinear trajectory, at the very least while the boat is not turning, and to maintain a constant trim and constant heading, that is to say in practice for the body to remain vertical and oriented towards the boat. To achieve this, use is generally made of a structure such as represented in FIG. 2. The body 203 of the vehicle, which has substantially the shape of a column with elliptical cross-section of fairly large aspect ratio, is hauled by the cable 102, to which it is joined by a rigid stirrup 202, whose points of fixing to the vehicle are fixed in an articulated manner at the location of the centre of drag of this body. In this way this stirrup ensures good roll stability of the hauled vehicle. The cable 104 for towing the linear array 105 is itself tied to the rear of the body, at a spot situated in the horizontal plane passing through this centre of drag. To ensure the vertical stability of the vehicle, the distribution of the masses inside the body is contrived in such a way that the centre of gravity 101 of the latter is located well beneath the articulation between the stirrup 202 and the body 203. The yaw stability originates in part from the action of the stirrup 202 and it is improved by using vertical fins 205 fixed to the top and bottom of the body.

Such a device operates relatively well, at the very least while the height/width ratio of the body of the vehicle is not too large and it is not sought to submerge it too deeply.

Now, the current tendency consists in seeking deeper and deeper submersions both in respect of the transmitter and in respect of the receiving array associated therewith, essentially so as to increase the detection range. Under these conditions, and since the length of the hauling cable 102 cannot be permitted to be excessively lengthened, for large depths an inclination of the stirrup 202 with respect to the vertical of the body of the vehicle is obtained which is itself large. Bringing the stirrup closer to this vertical tends to increase the instability of the body of the towed vehicle considerably.

Furthermore, in order to have simultaneously a higher array gain and lower electrical consumption, it is also sought to use much taller transmitters than those already known. The vehicles comprising these transmitters then have substantially the shape of a vertical wing of large height/width ratio. Such vehicles have very poor stability in yaw and in the event of the manoeuvring of the hauling boat, thus tending to make them drift from a rectilinear trajectory. Furthermore, as soon as the speed exceeds about ten knots the appearance of an effect of the "kite" type is observed. Under this effect the body pulls to one side or the other and tends to lie down, and this causes it to resurface beyond a certain speed since the hydrodynamic lift then becomes very large compared with this body's weight in the water.

All these effects are unacceptable during operational use and it is not conceivable to limit the operational capacity of this system as a function of the circumstances encountered, for example by reducing the speed.

It has been attempted to improve this system by fitting it with a tail assembly, articulated to the same point of articulation as the stirrup 202 and which makes it possible to stabilize this undesirable motion to a certain extent. The cable 104 enabling the linear array to be towed is then fastened to the rear of this tail assembly. Unfortunately, when extracting from the water during the operations for recovering the whole the tail assembly tends to rise up, and in order to avoid this undesirable effect it is expedient to motorize the articulation between the tail assembly and the body, so as to align the latter with the tail assembly before extraction from the water. This motorization naturally complicates the device and increases its cost. It is furthermore only relatively effective and it is observed that the placing of such a body into the water and its recovery present major difficulties. In fact, when part of the body begins to emerge, the drag of the submerged part becomes predominant and tends to make the device as a whole tip up. The motions can then no longer be controlled, all the more so since disturbances due to the wake from the boat and to the wash from the propellers are added to the disturbances due to the transit at the air/water interface.

Furthermore the location for storing this device in the towboat outside of operational periods is of limited dimensions. In order to be able to stow the vehicle in this location, it is then expedient to install a system for tipping the vehicle up at the time of anchorage or recovery, so as to be able to stow it in a position which is compatible with the limited height available in the storage location. The means to be implemented are heavy and expensive and their use is risky and dangerous.

SUMMARY OF THE INVENTION

To alleviate these drawbacks, the invention proposes a towed acoustic transmitter, of the type comprising a vertical faired acoustic array and a towing hook, mainly characterized in that it comprises a ballasted and faired fore body joined to the array by a girder of small cross-section, in that the respective masses of the array and of the body are such that the centre of gravity of the whole is situated near the junction of the girder and the fore body and beneath this girder, and in that the towing hook is articulated to a swivel joint situated on the upper part of the girder above this centre of gravity.

According to another characteristic, the girder is fixed substantially at the centre of the faired array and the array also supports horizontal ailerons.

According to another characteristic, the transmitter furthermore comprises means for towing a linear acoustic array fixed to the rear of the faired acoustic array along the alignment of the said girder.

According to another characteristic, the transmitter furthermore comprises horizontal depressor ailerons fixed to the girder to the rear of the point of fixing of the towing hook, so as to obtain a negative downlift effect tending to submerge the transmitter under the action of the towing.

According to another characteristic, the faired acoustic array comprises a set of distinct transducers included in individual fairings, these fairings being joined together by vertical fixed planes-of very thin cross-section.

According to another characteristic, the faired acoustic array is hollow and comprises means enabling seawater to fill these hollow parts during submersion and to escape during recovery.

According to another characteristic, the towing hook and the girder are devised so as to enable the said transmitter to be fastened in a suspended position from a saddle situated on the transmitter anchorage and capture system.

BRIEF DESCRIPTION OF THE DRAWINGS

Other features and advantages of the invention will emerge clearly in the following description presented by way of non-limiting example in conjunction with the appended figures which represent.

DETAILED DESCRIPTION OF THE PREFERRED EMBODIMENTS

Figure 1:
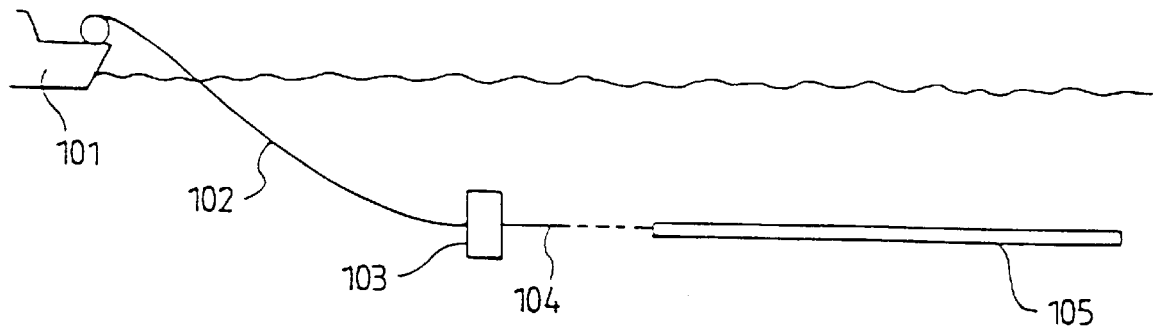
FIG. 1, a diagrammatic view of the general system for towing a linear acoustic array by way of a towed acoustic transmitter.
Figure 2:
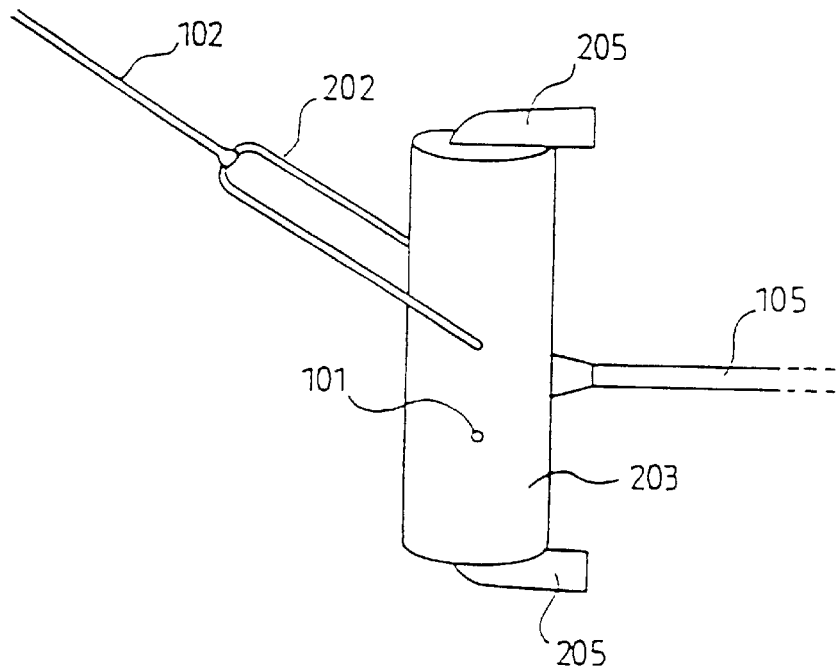
FIG. 2, a view of a towed acoustic transmitter according to the known art.
Figure 3:
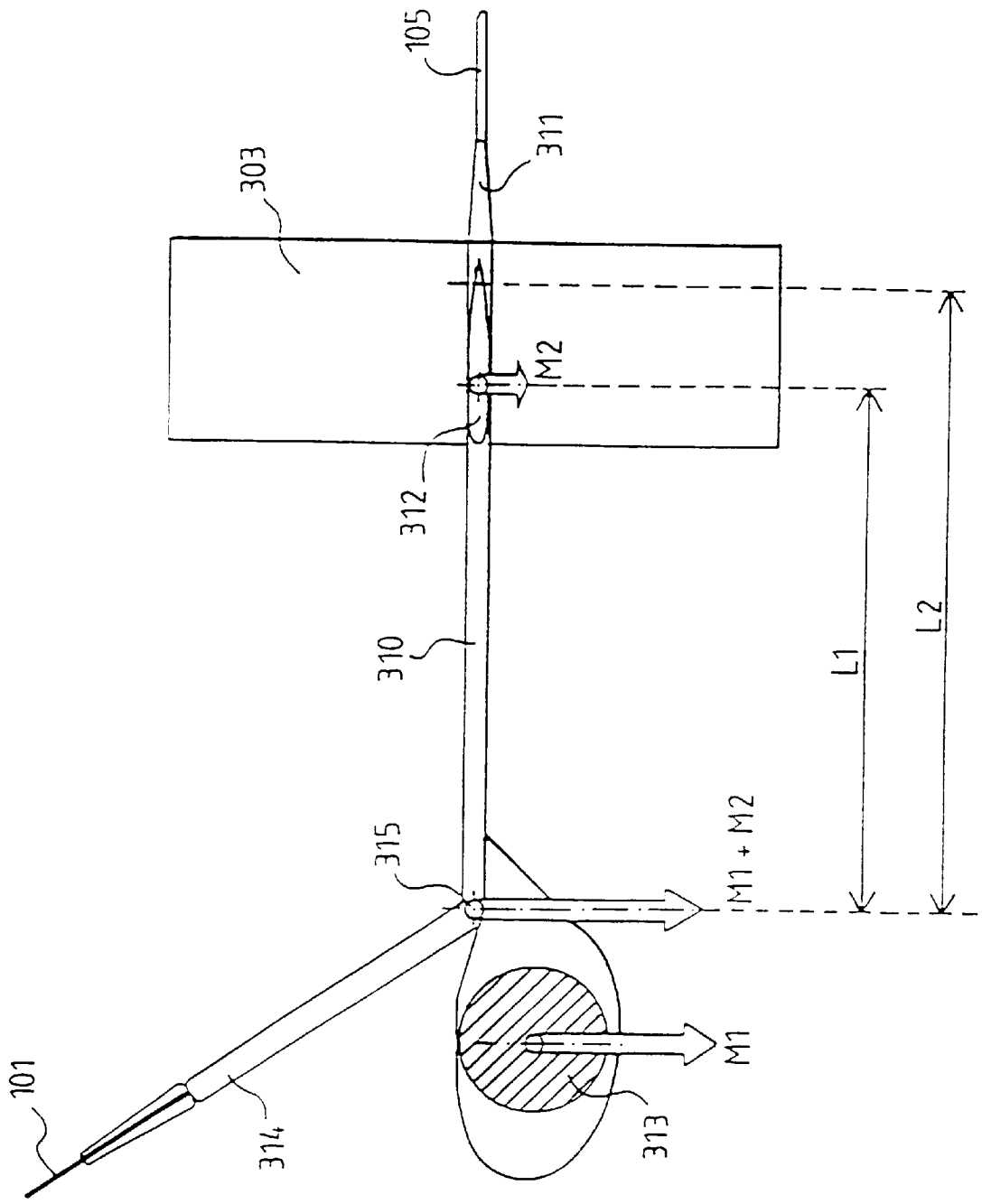
FIGS. 3 and 4, side and plan views of a towed acoustic transmitter according to the invention.
Figure 4:
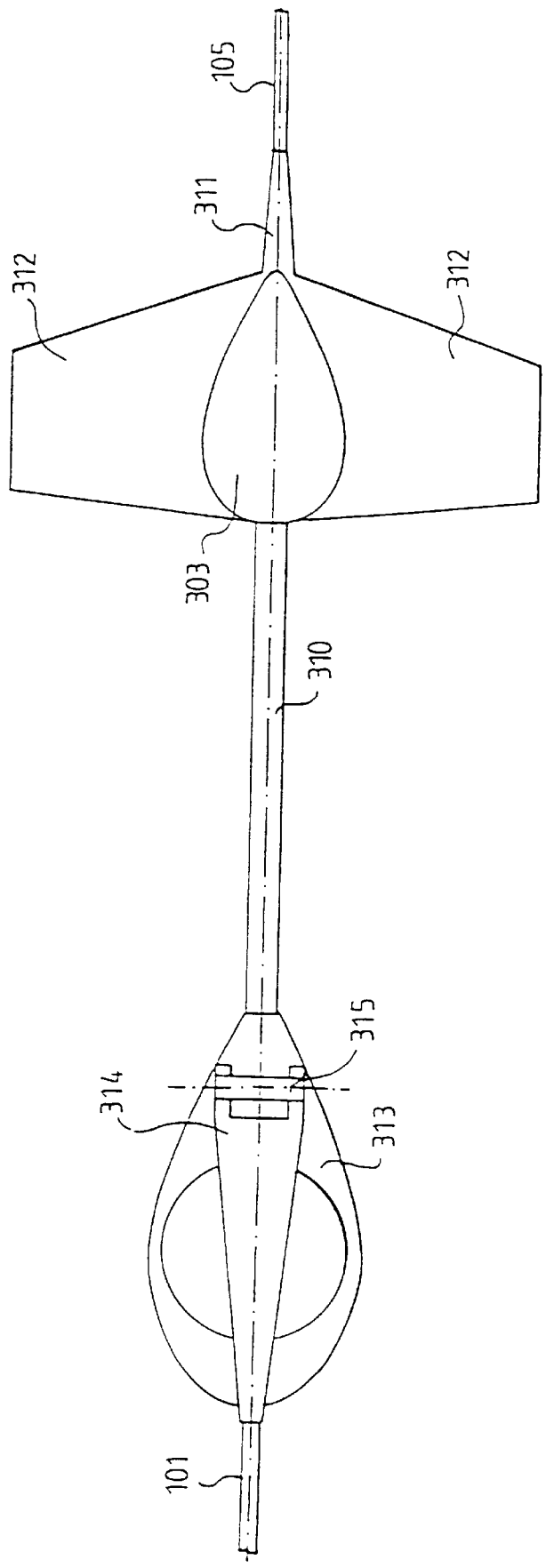

The transmitter vehicle according to the invention, represented in FIGS. 3 and 4, comprises a faired acoustic transmission array 303 whose horizontal cross-section is ovoid so as to adopt a streamlined profile of minimum resistance and minimum lift. This array is vertical and forms a rear fin of the towed vehicle.

This array is fixed at its middle to a girder 310 of small cross-section which extends rearward via a tie 311 making it possible to fasten the cable 105 for hauling the linear acoustic receiving array.

The acoustic array 303 furthermore includes two horizontal ailerons 312 which are fixed perpendicularly to its surface at the centre of the latter, and hence at the level of the girder 310. These ailerons form the horizontal plane of the tail assembly of the towed vehicle and, in conjunction with the action of the faired array, make it possible to stabilize this vehicle.

The fore part of the vehicle is formed by a faired ballast 313 which is fixed to the fore part of the girder 310. In the figure this faired ballast is represented by a hefty sphere surrounded by a streamlined fairing, but it may very well consist in practice of the fairing and its contents as a whole. Advantageously this ballast will be formed by the electronic transmission units making it possible to power the transducers of the array 303 by way of connection cables passing through the girder 310, which will then be hollow. The heavy towing cable 101 is fastened to a rigid arm 314, which is linked to the towed vehicle by way of a swivel joint depicted in a simplified manner in the figure by a horizontal pin 315, which serves as articulation between this arm and the vehicle. This pin is fixed to the vehicle at the junction point between the arm 310 and the faired ballast 313. In the embodiment described in the figure, that end of the arm 314 which is fixed to the pin 315 has the shape of a fork with two prongs which are fixed to the ends of this pin, and the pin itself is fixed to the towed vehicle by its central part. Any other system ensuring articulation according to a horizontal axis perpendicular to the direction of advance of the vehicle can be used.

Bearing in mind the masses stemming from the structure of the vehicle, the fore part of the latter is ballasted in such a way as to represent a mass M1 whose resultant with the mass M2 corresponding to the whole of the rear part of the vehicle, that is to say to the mass of the faired array 303, corresponds to a mass M1+M2 applied at a centre of gravity which lies plumb with the pin 315 and beneath the latter when the vehicle exhibits an operating trim in which the arm 310 and the ailerons 312 are horizontal.

The centre of drag, corresponding in essence to the hydrodynamic thrust on the tail assembly formed by the faired array 303 and the ailerons 312, will itself be situated far to the rear of this pin 315.

Under these conditions, when the vehicle is towed the force corresponding to the weight of the vehicle will be balanced by the hauling force by the cable 101 and the drag force corresponding to the lift of the tail assemblies and to that of the acoustic linear array 105. Bearing in mind the respective arrangements of the various units and the forces present described above, any onset of instability tending to deviate the longitudinal axis of the towed vehicle, demarcated by the girder 310, away from the hauling boat towing trajectory, tends to initiate a restoring torque which returns the vehicle to its position of use corresponding to the direction described above for the girder 310.

Automatic stability of the vehicle towed on its trajectory has thus been obtained.

Moreover, with such a structure it is easy to seize the vehicle at the level of the girder 310, for example with the aid of a device known as a fastening saddle. Under these conditions, when the vehicle is brought on board the towboat, it is possible to fasten it to such a saddle fixed to the mechanical anchorage and capture system, at a height sufficient to allow the faired array 303 to be accommodated between the ceiling and the floor of the storage hangar. The vehicle will thus be manipulated in its natural position, which is itself stable as a function of the position of its centre of gravity, and the manipulations to be performed in order to place it in the storage hangar and fix it to the retaining saddle are reduced to the minimum and will not present any difficulties, or therefore any particular danger.

Figure 5:
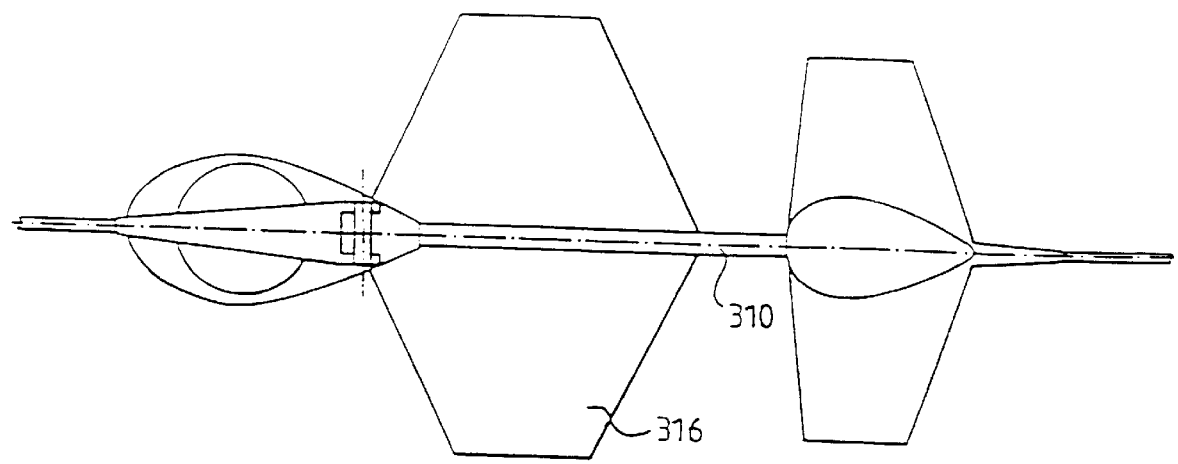
FIG. 5, a plan view of a variant of the invention.

The whole formed by this vehicle and the linear array which to it fastened [sic] sails at a specified depth of submersion, the value of which is adjusted by means known per se. With the aim of facilitating the action of these means for controlling submersion, so as among other things to be able to attain the largest submersions, the invention also proposes to fit horizontal planes 316 such as represented in FIG. 5 to the vehicle as described above which make it possible to obtain a downwards lift which is added to the weight in the water so as to increase the submersion. The value of this downlift varies according to the square of the speed, in the same way as the drag of the vehicle, thus making it possible to stabilize the submersion.

In this case it is possible, in order to facilitate stability during the gyration manoeuvres, to tie the receiving array 105 to the ends of the planes 316 by way of a cable 701 forming a V whose tip is behind the transmission array, rather than to the rear of the transmission array 303. The receiving array is fixed by a boom 704 and a clevis 703 to a pulley 702 which rolls inside the V formed by the cable 701. The electrical connections are ensured by a slack cable 705. In this way the lateral displacement of the towing point corresponds virtually to a rotation about the intersection of the perpendiculars to the cable at its securing points on the planes 316. Thus the whole behaves as if the receiving array were fastened close to the towing centre, both laterally and horizontally.

Figure 6:
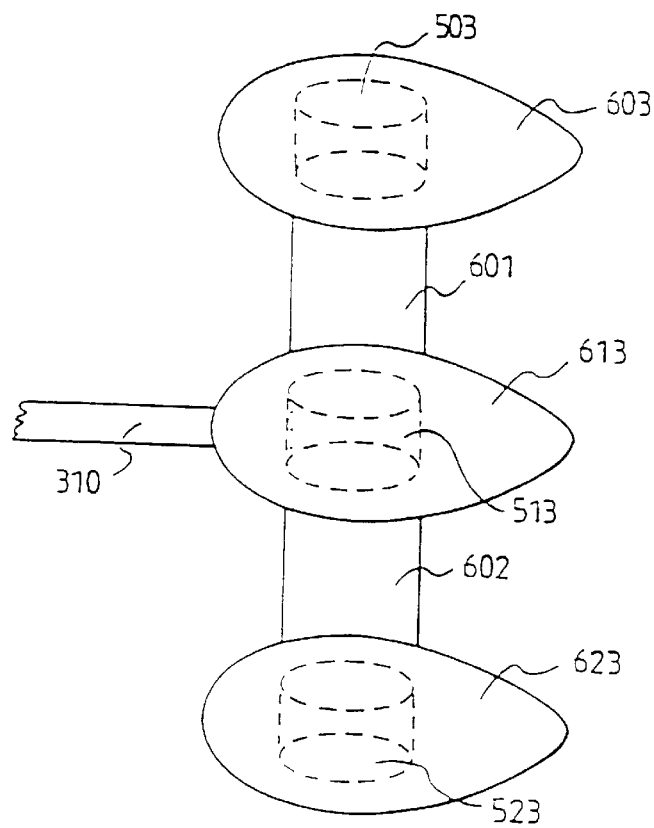
FIG. 6, a view of the array of another variant of the invention.
Figure 7:
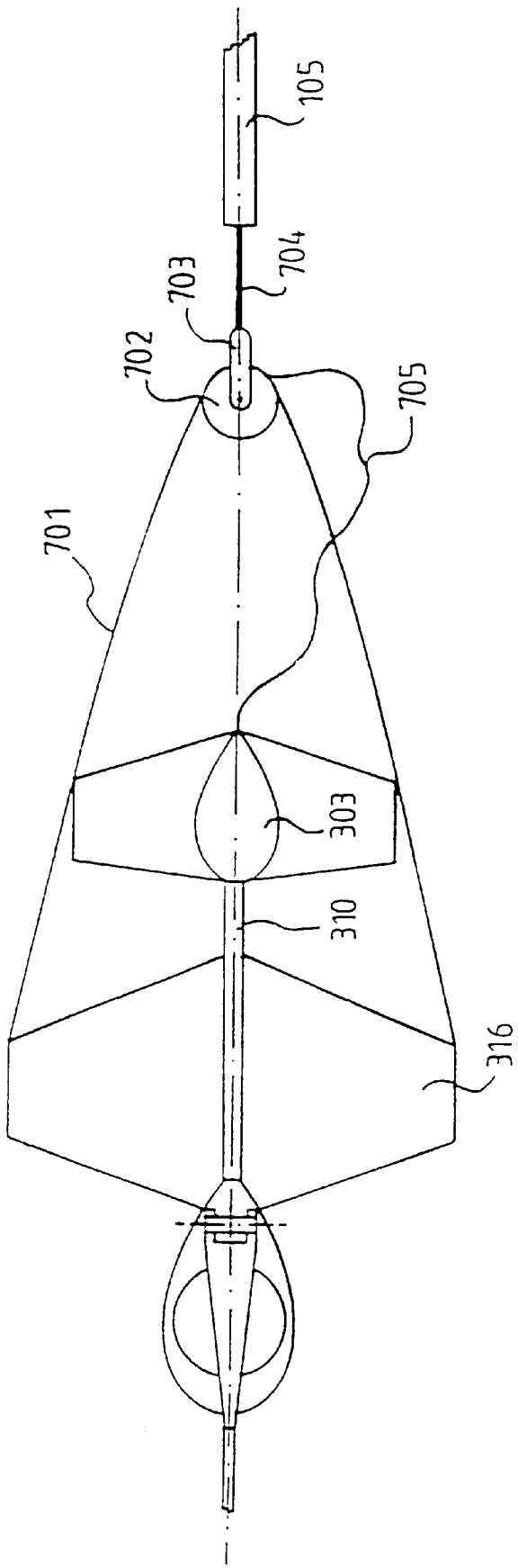
FIG. 7, a plan view of a sub-variant of the variant of FIG. 5.

Moreover, in certain cases the transducers of the transmission array which are contained in the fairing 303 are separated by relatively large distances compared with the dimensions of these transducers. Therefore, it is not then useful to use a monobloc fairing to enclose the transducers as a whole. Under these conditions, the invention proposes by way of a variant, as represented in FIG. 6, to split up this fairing 303 so as to obtain for example three fairings 603 to 623 enclosing the three distinct transducers 503, 513 and 523. These fairings will have the most streamlined shape possible and as in the case represented in the figure will exhibit an ovoid shape. They will be held together by vertical fixed planes 601 and 602, of fairly narrow cross-section and exhibiting only very small drag. The thickness of these fixed planes will be reduced to the minimum making it possible to obtain the necessary rigidity while allowing internal passage of the transducer power conductors 503 to 523.

Finally in certain cases the transducers used include relatively large hollow internal volumes which tend to give the whole positive buoyancy, this being unhelpful to the objective sought. To compensate for this buoyancy, it is expedient to ballast the vehicle in an additional manner. When this ballast is obtained by construction, it obviously requires greater effort and pieces dimensioned accordingly so as to be able to manipulate the vehicle while it is being extracted from the water and during stowage thereof in its hauling vessel. To obtain simultaneously a sufficient weight in the water and as small as possible a weight in the air when the vehicle has been extracted from the water, the invention furthermore proposes to devise the hollow internal parts of these transducers in such a way as to be able to introduce thereto a large quantity of water when they are submerged. The reservoirs located for this purpose inside these transducers so as to receive the water will be designed in such a way as not to impair the acoustic characteristics of the transducers, for example by designing an air sheet between these reservoirs and the active part of the transducers. Furthermore the openings intended for draining the filling water when the vehicle leaves the water will be devised in such a way that the water is discharged naturally by gravity.

The towed acoustic transmitter vehicle thus described allows stable sailing at depth within a large speed region which may exceed 30 knots. Manoeuvring tolerance during sailing is particularly great. Anchorage and raising of these vehicles is performed as easily as with bodies of horizontal shape since anchorage and capture are performed from above, and finally the stability in the wake during submersion and recovery is entirely satisfactory.

What is claimed as new and desired to be secured by Letters Patent of the U.S. is:

1. Towed acoustic transmitter, of the type comprising a vertical faired acoustic array and a towing hook, said towed acoustic transmitter comprising a ballasted and faired fore body joined to the array by a girder of small cross-section, in that the respective masses of the array and of the body are such that the centre of gravity of said towed acoustic transmitter is situated near the junction of the girder and the fore body and beneath this girder, and wherein the towing hook is articulated to a swivel joint situated on the upper part of the girder above this centre of gravity.

2. Transmitter according to claim 1, characterized in that the girder is fixed substantially at the centre of the faired array and in that this array also supports horizontal ailerons.

3. Transmitter according to claim 1, characterized in that it furthermore comprises means for towing a linear acoustic array fixed to the rear of the faired acoustic array along the alignment of the said girder.

4. Transmitter according to claim 1, characterized in that it furthermore comprises horizontal depressor ailerons fixed to the girder to the rear of the point of fixing of the towing hook, so as to obtain a negative downlift effect tending to submerge the transmitter under the action of the towing.

5. Transmitter according to claim 1, characterized in that the faired acoustic array comprises a set of distinct transducers included in individual fairings, these fairings being joined together by vertical fixed planes of very thin cross-section.

6. Transmitter according to claim 1, characterized in that the faired acoustic array is hollow and comprises means enabling seawater to fill these hollow parts during submersion and to escape during recovery.

7. Transmitter according to claim 1, characterized in that the towing hook and the girder are devised so as to enable the said transmitter to be fastened in a suspended position from a saddle situated on the transmitter anchorage and capture system.

8. Transmitter according to claim 4, further comprising means for towing a linear acoustic array, comprising a V-shaped cable fixed by its two ends to the ends of the the depressor ailerons, a pulley which rolls inside the V formed by the cable, and means for fastening the linear acoustic array to the pulley.

9. Transmitter according to claim 2, further comprising means for towing a linear acoustic array fixed to the rear of the faired acoustic array along the alignment of the said girder.

10. Transmitter according to claim 2, further comprising horizontal depressor ailerons fixed to the girder to the rear of the point of fixing of the towing hook, so as to obtain a negative downlift effect tending to submerge the transmitter under the action of the towing.

11. Transmitter according to claim 3, further comprising horizontal depressor ailerons fixed to the girder to the rear of the point of fixing of the towing hook, so as to obtain a negative downlift effect tending to submerge the transmitter under the action of the towing.

12. Transmitter according to claim 2, characterized in that the faired acoustic array comprises a set of distinct transducers included in individual fairings, these fairings being joined together by vertical fixed planes of very thin cross-section.

13. Transmitter according to claim 3, characterized in that the faired acoustic array comprises a set of distinct transducers included in individual fairings, these fairings being joined together by vertical fixed planes of very thin cross-section.

14. Transmitter according to claim 4, characterized in that the faired acoustic array comprises a set of distinct transducers included in individual fairings, these fairings being joined together by vertical fixed planes of very thin cross-section.

15. Transmitter according to claim 2, characterized in that the faired acoustic array is hollow and comprises means enabling seawater to fill these hollow parts during submersion and to escape during recovery.

16. Transmitter according to claim 3, characterized in that the faired acoustic array is hollow and comprises means enabling seawater to fill these hollow parts during submersion and to escape during recovery.

17. Transmitter according to claim 4, characterized in that the faired acoustic array is hollow and comprises means enabling seawater to fill these hollow parts during submersion and to escape during recovery.

18. Transmitter according to claim 5, characterized in that the faired acoustic array is hollow and comprises means enabling seawater to fill these hollow parts during submersion and to escape during recovery.

19. Transmitter according to claim 2, characterized in that the towing hook and the girder are devised so as to enable the said transmitter to be fastened in a suspended position from a saddle situated on the transmitter anchorage and capture system.

20. Transmitter according to claim 3, characterized in that the towing hook and the girder are devised so as to enable the said transmitter to be fastened in a suspended position from a saddle situated on the transmitter anchorage and capture system.

* * * * *